United States Patent
Zhang et al.

(10) Patent No.: US 10,461,329 B2
(45) Date of Patent: Oct. 29, 2019

(54) HIGH CAPACITY PHOSPHOROUS SULFIDE BASED CATHODE MATERIALS FOR MAGNESIUM BATTERIES

(71) Applicant: Toyota Motor Engineering & Manufacturing North America, Inc., Erlanger, KY (US)

(72) Inventors: Ruigang Zhang, Ann Arbor, MI (US); Koji Suto, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 169 days.

(21) Appl. No.: 15/370,846

(22) Filed: Dec. 6, 2016

(65) Prior Publication Data

US 2018/0159130 A1    Jun. 7, 2018

(51) Int. Cl.
*H01M 4/58* (2010.01)
*H01M 10/054* (2010.01)
*H01M 4/62* (2006.01)
*H01M 4/136* (2010.01)
*H01M 4/36* (2006.01)
*H01M 4/02* (2006.01)

(52) U.S. Cl.
CPC ........ *H01M 4/5815* (2013.01); *H01M 4/136* (2013.01); *H01M 4/364* (2013.01); *H01M 4/622* (2013.01); *H01M 4/625* (2013.01); *H01M 10/054* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 9,166,253 B2 | 10/2015 | Fujiki et al. | |
| 2005/0191550 A1* | 9/2005 | Satoh | H01M 4/133 429/217 |
| 2012/0164537 A1 | 6/2012 | Aoyagi et al. | |
| 2014/0349199 A1* | 11/2014 | Mohtadi | H01M 4/381 429/337 |
| 2015/0044576 A1 | 2/2015 | Eisele et al. | |
| 2015/0311520 A1 | 10/2015 | Mizuno et al. | |
| 2016/0054267 A1* | 2/2016 | Lee | G01N 29/12 73/579 |

FOREIGN PATENT DOCUMENTS

CN    104241595 A    12/2014
JP    2008-84798 A    4/2008

* cited by examiner

*Primary Examiner* — Christopher P Domone
(74) *Attorney, Agent, or Firm* — Oblon, McClelland, Maier & Neustadt, LLP

(57) ABSTRACT

An electrode active material comprising an amorphous or crystalline composite of phosphorous sulfide having the general formula $M_xP_yS_z$, wherein M is a metal and x, y, and z are positive whole numbers. Electrochemical cells and a reversible battery having a cathode containing one of the electrode active materials are also provided. In specific embodiments, the battery is a magnesium battery. In addition, methods of forming the composites and electrodes via ball milling and in situ electrochemical reactions are provided.

26 Claims, 9 Drawing Sheets

HIGH CAPACITY PHOSPHOROUS SULFIDE BASED CATHODE MATERIALS FOR MAGNESIUM BATTERIES

BACKGROUND

Field of the Disclosure

This disclosure is directed to high capacity phosphorous sulfide composite based electrode materials suitable for use in forming the active material of a cathode and methods of forming the composites and electrodes. This disclosure is also directed to an electrode formed from these phosphorous sulfide composite materials as well as an electrochemical cell or battery, specifically a magnesium battery, containing the cathode.

Discussion of the Background

Lithium-ion batteries currently dominate the market of portable electronic devices. Despite their great success in portable electronic devices, in larger scale applications the current generation of Li-ion batteries is still challenged by requirements such as high energy density and power density, as well as concerns related to a supply risk. Thus, considerable interest has been focused on the development of a post Li-ion battery, including Li-sulfur, Li-air, Na-ion, Mg-ion, and Al-ion battery alternatives.

Despite significant research activities, all of these post Li-ion batteries are still in the experimental laboratory stage due to challenges related to marrying appropriate electrode and electrolyte combination and ensuring safe operation. The magnesium-ion battery, for example, has attracted a lot of attention recently due to the high volumetric capacity of the negative magnesium electrode and its relatively safer operation. However, there is no cathode with a high enough voltage (>2 V) and reversible capacity (>50 mAh/g) that matches the negative magnesium electrode for a full cell. Traditionally, oxides or polyanions (i.e. $PO_4^{3-}$, $SiO_4^{4-}$) based materials have been investigated as cathode materials for magnesium batteries. However, the strong Mg—O bonds lead to extremely slow diffusion of $Mg^{2+}$ in the solid state lattice. Although the addition of $H_2O$ can improve the diffusivity of $Mg^{2+}$ in those materials, the co-insertion of a proton and the incompatibility between $H_2O$ and the Mg anode rule out the practical application of this type of magnesium battery. This has lead researchers to explore "softer" lattices (i.e. S, P, and Se) instead of oxygen which has proven a promising means of discovering new cathode materials for Mg batteries. For example, $Mo_6S_8$ and spinel $TiS_2$ have shown relatively good electrochemical performance. However, their low energy density and/or extremely difficult preparation process has hindered the realization of practical Mg batteries. Sulfur itself has also been investigated, but the dissolution of the magnesiated phase ($Mg_xS_y$) in the electrolyte has not been overcome. Advanced cathode materials must be discovered in order to achieve practical divalent cation batteries.

In view of the forgoing, an aspect of the present disclosure is to provide a group of phosphorous sulfide based electrode materials which meets the requirements of a high energy magnesium battery and overcomes the deficiencies of oxide or polyanion based cathode materials for magnesium batteries. Another aspect of the present disclosure is to provide electrochemical and milling methods for preparing these materials. Another aspect of the present disclosure is to provide a positive electrode based on phosphorous sulfide materials and electrochemical cells, specifically magnesium batteries, containing the positive electrode and having advantageous energy density and performance in comparison to known magnesium electrochemical devices.

SUMMARY OF THE DISCLOSURE

These and other objects have been achieved by and are addressed by the present disclosure. According to a first aspect, the present disclosure relates to an electrode material, comprising a composite of formula (I)

$$M_xP_yS_z \qquad (I)$$

wherein M is at least one metal selected from the group consisting of Mg, Ag, Cu, Fe, Ni, Co, Cr, and Mn, x, y, and z are each independently a positive number, and wherein the composite, the material, or both do not comprise an oxide species.

In one embodiment, the structure of the composite is substantially amorphous or substantially crystalline.

In one embodiment, the composite of formula (I) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_6S_7$, $Cu_7P_6S_{22}$, and $Cu_3P_2S_8$.

According to a second aspect, the present disclosure relates to an electrode, comprising (i) a current conductive agent and (ii) an electrode material, the electrode material comprising a composite of formula (I)

$$M_xP_yS_z \qquad (I)$$

wherein M is a metal, x, y, and z are each independently a positive number, and wherein the composite, the material, or both do not comprise an oxide species.

In one embodiment, the structure of the composite is substantially amorphous or substantially crystalline.

In one embodiment, the metal is at least one metal selected from the group consisting of Ag, Mg, Cu, Fe, Ni, Co, Cr, and Mn.

In one embodiment, the composite of formula (I) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_2S_7$, $Cu_7P_6S_{22}$, and $Cu_3P_2S_8$.

In one embodiment, the electrode comprises 40-90% by weight of the electrode material relative to the total weight of the electrode.

In one embodiment, the current conductive agent is a conductive carbon, and the electrode comprises 10-30% by weight of the conductive carbon relative to the total weight of the electrode.

In one embodiment, the electrode further comprises (iii) a polymeric binder, and the electrode comprises 5-30% by weight of the polymeric binder relative to the total weight of the electrode.

According to a third aspect, the present disclosure relates to an electrochemical cell, comprising (i) an anode, (ii) a cathode comprising the electrode in any of its embodiments, and (iii) an electrolyte, wherein the anode and the cathode are capable of absorbing an alkali metal ion, an alkaline earth metal ion, or both.

In one embodiment, the anode is magnesium.

According to a fourth aspect, the present disclosure relates to a magnesium battery comprising the electrochemical cell in any of its embodiments.

In one embodiment, the structure of the composite is substantially amorphous or substantially crystalline.

In one embodiment, the metal is at least one metal selected from the group consisting of Ag, Mg, Cu, Fe, Ni, Co, Cr and Mn.

In one embodiment, the composite of formula (I) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_2S_7$, $Cu_7P_6S_{22}$, and $Cu_3P_2S_8$.

In one embodiment, the cathode comprises (i) 40-90% by weight of the electrode material relative to the total weight of the cathode, (ii) 10-30% by weight of a conductive carbon as the current conductive agent relative to the total weight of the cathode, and (iii) 5-30% by weight of a polymeric binder relative to the total weight of the cathode.

In one embodiment, the electrolyte comprises at least one selected from the group consisting of $Mg(CB_{11}H_{12})_2$ and $C_6H_5MgCl$.

In one embodiment, the magnesium battery has a capacity of 80-600 mAh/g.

In one embodiment, the magnesium battery has an average voltage of 1.0-2.0 V vs. $Mg/Mg^{2+}$.

According to a fifth aspect, the present disclosure relates to a vehicle comprising the magnesium battery in any of its embodiments.

According to a sixth aspect, the present disclosure relates to an electronic device comprising the magnesium battery in any of its embodiments.

According to a seventh aspect, the present disclosure relates to a method of forming the electrode material in any of its embodiments, comprising ball milling a metal sulfide material and a phosphorous sulfide material.

In one embodiment, the metal sulfide is at least one selected from the group consisting of MgS, FeS, CuS, $Ag_2S$, NiS, CoS, $Cr_2S_3$, and MnS.

In one embodiment, the phosphorous sulfide is at least one selected from the group consisting of $P_2S_5$, $P_4S_4$, $P_4S_5$, $P_4S_6$, $P_4S_7$, $P_4S_8$, and $P_4S_9$.

According to an eighth aspect, the present disclosure relates to a method of forming an in situ electrode material, the method comprising passing an electrical current through the electrochemical cell in any of its embodiments to generate and in situ electrode material comprising a composite of formula (II)

$$N_aP_bS_c \qquad (II)$$

wherein N is a metal, a, b, and c are each independently a positive number, and wherein the composite, the material, or both do not comprise an oxide species, and wherein the in situ electrode material is different than the electrode material and the metal N is different than the metal M.

In one embodiment, the metal M is at least one selected from the group consisting of Ag, Mg, Cu, Fe, Ni, Co, Cr, and Mn and the metal N is at least one selected from the group consisting of Ag, Mg, Cu, Fe, Ni, Co, Cr, and Mn.

In one embodiment, the composite of formula (I) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_2S_7$, $Cu_7P_6S_{22}$, and $Cu_3P_2S_8$ and the composite of formula (II) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_2S_7$, $Cu_7P_6S_{22}$, and $Cu_3P_2S_8$.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

DETAILED DESCRIPTION OF THE DISCLOSURE

Figure 1:
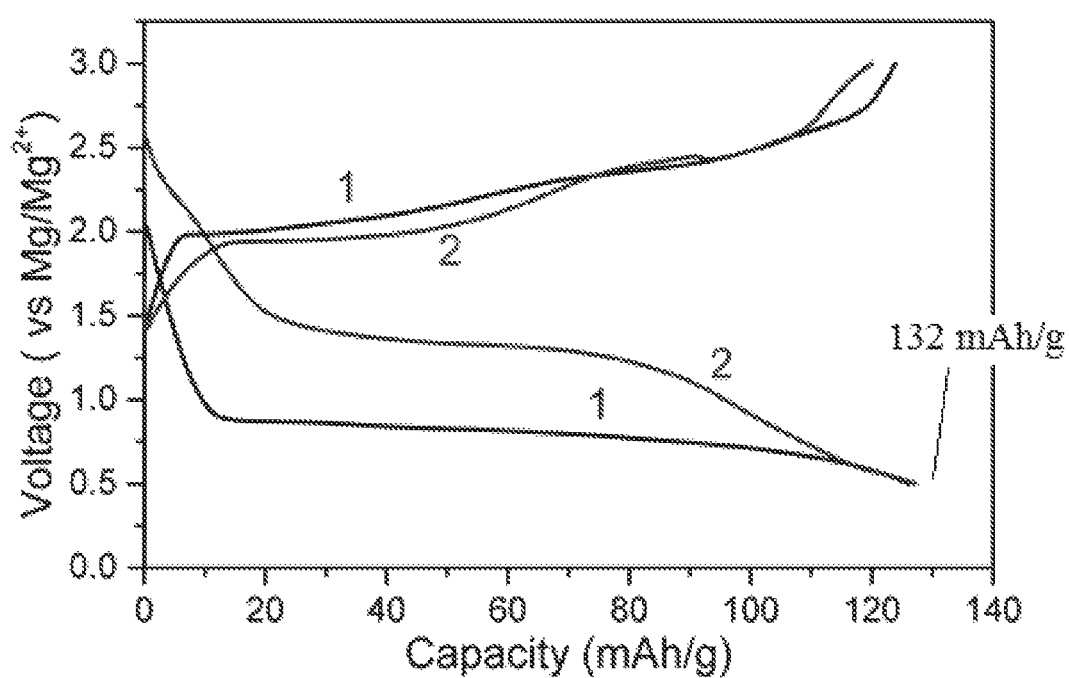
FIG. 1 shows a cycling profile of a 2032 coin cell magnesium battery employing $Mg(CB_{11}H_{12})_2$ (MMC) as an electrolyte and with a cathode containing 60 wt % of an amorphous $Ag_7P_3S_7$ (a-APS) composite active material.

Within the description of this disclosure, all cited references, patents, applications, publications and articles that are under authorship, joint authorship or ascribed to members of the Assignee organization are incorporated herein by reference. Where a numerical limit or range is stated, the endpoints are included. Also, all values and subranges within a numerical limit or range are specifically included as if explicitly written out. As used herein, the word "a" and "an" and the like carry the meaning of "one or more". The phrases "selected from the group consisting of", "chosen from", and the like include mixtures of the specified materials. Terms such as "contain(s)" and the like are open terms meaning "including at least" unless otherwise specifically noted.

The inventors are directing effort and resources to the study of materials which may function as cathode active materials for a magnesium battery and be useful to produce a battery of sufficient capacity and cycle lifetime to be competitive with and replace a combustion engine or lithium ion battery as a power source as well as other utilities requiring a high capacity, high cycle lifetime battery. In addition, a battery suitable for large scale intermittent energy storage will also be important for storage of green energy such as provided by wind and solar generation methods. In order to achieve this goal and in view of the technologies described above, the inventors have studied metal phosphorous sulfide materials to discover cathode active material which are readily available, safe and comparatively easy to handle in a production environment and which provide a magnesium battery having high capacity and a high working potential.

The materials and classes of materials, described herein, are promising for use as magnesium insertion materials in magnesium-ion batteries. The rate of magnesium insertion into these materials is comparable to or better than the rate of the magnesium insertion into Chevrel-phase compounds, and a battery with a magnesium anode and one of these materials as cathode has significantly higher theoretical energy density and specific energy than a similar battery with a Chevrel-phase cathode. Chevrel compounds are series of ternary molybdenum chalcogenide compounds having the general formula $M_xMo_6X_8$, where M represents any one of a number of metallic elements throughout the periodic table; x has values between 1 and 4, depending on the M element; and X is a chalcogen (sulfur, selenium or tellurium). A more recent interfacial understanding of the Chevrel phase has revealed that these Mg—O bond rich materials and interfaces blocks $Mg^{2+}$ movement; however, an Mg—S bond rich material or interface may promote $Mg^{2+}$ diffusion. Thus, novel sulfide materials may have promising electrochemical properties.

Materials as active materials in the electrodes of rechargeable Magnesium (Mg) batteries are described. These materials demonstrate high Mg mobility through the host crystal structure when the material is in both the charged and discharged state thus enabling transfer of charge to occur at useful rates during charge and discharge. In certain embodiments, the magnesium material has a magnesium diffusion barrier of less than 1.5 eV, preferably less than 1.0 eV, preferably less than 0.8 eV. The low diffusion barrier of the materials as described herein enables the material to be used as electrode active material in a magnesium battery. Additionally, the materials as described herein exhibit useful reaction voltage, high theoretical specific capacity, and stability during the electrochemical reaction.

According, to a first aspect, the present disclosure relates to an electrode material, comprising a composite of formula (I)

$$M_xP_yS_z \qquad (I)$$

wherein M is at least one metal selected from the group consisting of Mg, Ag, Cu, Fe, Ni, Co, Cr, and Mn, x, y, and z are each independently a positive number, and wherein the composite, the material, or both do not comprise an oxide species.

In a preferred embodiment, x is in the range of 1-10, preferably 2-8, preferably 3-4. In a preferred embodiment, y is in the range of 1-15, preferably 2-10, preferably 3-6. In a preferred embodiment, z is in the range of 1-30, preferably 4-20, preferably 6-18, preferably 8-16.

In a preferred embodiment, the structure of the composite is substantially amorphous or substantially crystalline. As used herein, an "amorphous" material or non-crystalline solid is a solid that lacks the long-range order characteristic of a crystal. As used herein a "crystalline" material is a solid material whose constituents (such as atoms, molecules or ions) are arranged in a highly ordered microscopic structure, forming a crystal lattice that extends in all directions. As used herein the term "substantially" refers to great than 90% of the electrode material. In certain preferred embodiments, the composite is substantially amorphous, preferably greater than 92%, preferably greater than 95%, preferably greater than 96%, preferably greater than 97%, preferably greater than 98%, preferably greater than 99% of the composite is amorphous. In certain preferred embodiments, the composite is substantially crystalline, preferably greater than 92%, preferably greater than 95%, preferably greater than 96%, preferably greater than 97%, preferably greater than 98%, preferably greater than 99%. In certain embodiments, a crystalline form of the composite may be formed from calcining an amorphous form of the composite. Exemplary calcination conditions may include heating at 40-500° C., preferably 60-450° C., preferably 80-400° C., preferably 100-350° C., preferably 150-300° C., preferably 200-280° C. for a time period of 0.25-24 hours, preferably 0.5-12 hours, preferably 1-8 hours, preferably 1.5-4 hours, or about two hours, preferably under an inert gas, preferably argon, In one embodiment, the composite of formula (I) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_2S_7$, $Cu_7P_6S_{22}$, and $Cu_3P_2S_8$.

According to a second aspect, the present disclosure relates to an electrode, comprising (i) a current conductive agent and (ii) an electrode material, the electrode material comprising a composite of formula (I)

$$M_xP_yS_z \qquad (I)$$

wherein M is a metal, x, y, and z are each independently a positive number, and wherein the composite, the material, or both do not comprise an oxide species.

In a preferred embodiment, the metal is at least one metal selected from the group consisting of Ag, Mg, Cu, Fe, Ni, Co, Cr, and Mn. Alternatively, the metal may be any suitable metal, preferably a transition metal. In a preferred embodiment, the composite of formula (I) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_2S_7$, $Cu_7P_6S_{22}$, and $Cu_3P_2S_8$.

In a preferred embodiment, the electrode has a total content of the electrode material comprising a composite of formula (I) that is 40-90% by weight of the current conductive agent relative to the total weight of the electrode, preferably 45-85% by weight, preferably 50-80% by weight, preferably 55-70% by weight, or about 60% by weight relative to the total weight of the electrode. In a preferred embodiment, the weight ratio of the electrode material to the polymeric binder is in the range from 10:1 to 1:1, preferably 5:1 to 2:1. In a preferred embodiment, the weight ratio of the electrode material to the current conductive agent is in the range from 10:1 to 1:1, preferably 5:1 to 2:1.

In certain embodiments, the electrode in any of its embodiments may further comprise conductive carbon as the current conductive agent. To prepare the electrode, the $M_xP_yS_z$ composite in any of the embodiments of the present disclosure may be mixed with a carbonaceous material or conductive carbon as the current conductive agent. Exemplary suitable carbonaceous materials or conductive carbons include, but are not limited to, graphite, carbon nanotubes, carbon black, and mixtures thereof.

As used herein, carbon black refers to a conductive carbon material in the form of paracrystalline carbon having a high surface area to volume ratio. Exemplary types of carbon black include, but are not limited to, acetylene black, channel black, furnace black, lamp black, thermal black, as well as commercially available carbon black including, but not limited to, Ketjen black, SuperP, Super P Li, Super C65, Enasco black and mixtures thereof. In certain embodiments, the conductive carbon is carbon black, preferably carbon black comprising acetylene black or Ketjen black. In certain embodiments, the carbon black may take the form of a particle, preferably of a substantially spherical shape and having a particle size in the range of 15-500 nm, preferably 15-300 nm, more preferably 15-150 nm and having a BET surface area in the range of 1000-1600 m$^2$/g, preferably 1200-1500 m$^2$/g, more preferably 1350-1500 m$^2$/g.

In a preferred embodiment, the electrode has a total content of the current conductive agent, preferably conductive carbon, that is 10-30% by weight of the current conductive agent relative to the total weight of the electrode, preferably 12-26% by weight, preferably 15-25% by weight, preferably 18-22% by weight, or about 20% by weight relative to the total weight of the electrode.

In certain embodiments, the electrode, in any of its embodiments may further comprise a binder, preferably a polymeric binder. To prepare the electrode, the $M_xP_yS_z$ composite in any of the embodiments of the present disclosure may be mixed with a binder. The binder material is not viewed as particularly limiting and any binder recognized by of one of ordinary skill in the art as suitable may be employed. Suitable binders are chemically stable in the potential window of use of the electrochemical cell described herein. The electrode is equally envisaged to be adapted to comprise one or more suitable binders.

Exemplary suitable binders include, but are not limited to, thermoplastics, thermosetting resins, polyethylene, polypropylene, polyimide, polyethylene oxide (PEO), polytetrafluoroethylene (PTFE), polyvinylidene fluoride (PVDE), styrene butadiene rubber (SBR), carboxymethyl cellulose, cyclodextrin a tetrafluoroethylene hexafluoro ethylenic copolymer, a tetrafluoroethylene hexfluoropropylene copolymer (FEP), a tetrafluoroethyl perfluoroalkyl vinyl ether copolymer (PFA), ethylene-tetrafluoroethylene copolymer (ETFE resin), polychlorotrifluoroethylen resin (PCTFE), a polypropylene-tetrafluoroethylene copolymer, an ethylene-chlorotrifluoroethylene copolymer (ECTFE), an ethylene-acrylic acid copolymer and mixtures or copolymers thereof. In a preferred embodiment, the polymeric binder is polytetrafluoroethylene (PTFE).

In a preferred embodiment, the electrode has a total content of the polymeric binder, preferably polytetrafluoroethylene (PTFE), that is 5-30% by weight of the polymeric binder relative to the total weight of the electrode, preferably 8-26% by weight, preferably 15-25% by weight, preferably 18-22% by weight, or about 20% by weight relative to the total weight of the electrode. In a preferred embodiment the weight ratio of the polymeric binder to the current conductive agent is in the range of 1:6 to 3:1, preferably 1:3 to 2:1, preferably 1:2 to 1.5:1, or about 1:1.

According to a third aspect, the present disclosure relates to an electrochemical cell, comprising (i) an anode, (ii) a cathode comprising the electrode in any of its embodiments, and (iii) an electrolyte, wherein the anode and the cathode are capable of absorbing an alkali metal ion, an alkaline earth metal ion, or both.

According to a fourth aspect, the present disclosure relates to a magnesium battery comprising the electrochemical cell described herein in any of its embodiments.

The cathode, thus prepared in any of its embodiments may be employed in the construction of an electrochemical cell or battery in any conventionally known manner comprising an anode, the electrode as described in any of its embodiments, and an electrolyte. Thus, according to another aspect, the present disclosure provides a battery. The cathode according to the present invention may be employed in any of a lithium battery, a sodium battery, or a magnesium battery. In a preferred embodiment, a magnesium battery having the cathode comprising the electrode containing the composite of formula $M_xP_yS_z$ described herein in any of its embodiments. As used herein, a battery may be defined as a composite of one or more electrochemical cells.

In a preferred embodiment, the anode comprises an alkali metal, alkaline earth metal or both. Exemplary alkali metals include, but are not limited to lithium (Li), sodium (Na), and potassium (K). Exemplary alkaline earth metals include, but are not limited to, beryllium (Be), magnesium (Mg) and calcium (Ca). In a preferred embodiment, the anode substantially comprises an alkaline earth metal as active material, most preferably magnesium as active material. In a preferred embodiment the anode is greater than 60% by weight magnesium metal relative to the total weight of the anode, preferably greater than 70%, preferably greater than 80%, preferably greater than 90%, preferably greater than 95%, preferably greater than 98%, preferably greater than 99% by weight magnesium metal relative to the total weight of the anode The anode of the magnesium battery may be any anode suitable for a magnesium battery, including, but not limited, to an anode of magnesium metal or a composition containing magnesium metal, such as for example $Mg_3Bi_2$. The anode active material may further include an electrically conductive material and a binder. Exemplary electrically conductive materials include, but are not limited to carbonaceous materials, including but not limited to carbon particles, graphite, carbon nanotubes, and carbon black. Exemplary binders include, but are not limited to a wide variety of polymers such as polytetrafluoroethylene (PTFE), polyvinylidene fluoride (PVDF), styrene butadiene rubber (SBR) and polyimide.

An electrolyte layer may be disposed between the anode and cathode and may include a separator which helps maintain electrical isolation between the positive and negative electrodes. As used herein, a separator may include fibers, particles, webbings porous sheets, or other forms of material configured to reduce the risk of physical contact and/or short circuit between the electrodes. The separator may be a unitary element, or may include a plurality of discrete spacer element such as particles or fibers. In certain embodiments, the electrolyte layer may include a separator infused with an electrolyte solution. In certain embodiments, such as for example those using a polymer electrolyte, the separator may be omitted. In a preferred embodiment, the electrochemical cell and the magnesium battery comprise a glassy fiber filter paper as separator.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any other appropriate form.

An electrolyte may include other compounds, such as for example additives to enhance ionic conductivity, and may in some examples include acidic or basic compounds as additives. As used herein, an electrolyte may be a liquid, gel, or solid. An electrolyte may be a polymer, such as for example including, but not limited to, a plasticized polymer, and may have a polymer infused with or otherwise including magnesium ions. In certain embodiments, the electrolyte may include a molten salt. In certain preferred embodiments, the electrolyte may include phenyl magnesium chloride (Ph-MgCl$^+$) with aluminum trichloride (AlCl$_3^-$) in tetrahydrofuran (THF), magnesium monocarbonane [Mg(CB$_{11}$H$_{12}$)$_2$]

in tetraglyme (TEGDME) or magnesium perchlorate [Mg(ClO$_4$)$_2$] in acetonitrile. In a preferred embodiment, the electrolyte comprises at least one selected from the group consisting of Ma(CB$_{11}$H$_{12}$)$_2$ (MMC) and C$_6$H$_5$MgCl/THF (APC).

In certain embodiments, the cathode active material or electrode active material may be present as a sheet, ribbon, particles or other suitable physical form. Further, an electrode comprising the cathode active material or electrode active material may be supported by a current collector or current conductive agent. A current collector or current conductive agent may include a metal or other electrically conducting sheet on which the electrode is supported. The current collector may be formed of carbon, carbon paper, carbon cloth or a metal or noble metal mesh or foil.

As used herein, a battery's capacity refers to the amount of electric charge it can deliver at a rated voltage. In a preferred embodiment, the magnesium battery of the present disclosure in any of its embodiments has a capacity of 80-600 mAh/g, preferably 90-500 mAh/g, preferably 100-400 mAh/g, preferably 110-300 mAh/g, preferably 120-200 mAh/g. In a preferred embodiment, the magnesium battery of the present disclosure in any of its embodiments has an average voltage of 1.0-2.0 V vs. Mg/Mg$^{2+}$, preferably 1.2-1.8 V vs. Mg/Mg$^{2+}$, preferably 1.4-1.6 V vs. Mg/Mg$^{2+}$, or about 1.5 V vs. Mg/Mg$^{2+}$.

In a preferred embodiment, the compounds, composites or materials having a magnesium diffusion barrier of less than 1.5 eV result in high rates of Mg-insertion into the compounds and Mg-extraction out of the compounds, which enables the compounds to be used in a magnesium battery. In certain preferred embodiments, the compounds as described herein have a magnesium diffusion barrier of less than 1.5 eV, preferably less than 1.0 eV, preferably less than 0.8 eV, preferably less than 0.7 eV, preferably less than 0.6 eV, preferably less than 0.5 eV, preferably less than 0.4 eV, preferably less than 0.3 eV, preferably less than 0.2 eV, preferably less than 0.1 eV. In some embodiments, the compounds, composites, or materials as described herein has a magnesium diffusion barrier of 50 meV-0.8 eV, preferably 100 meV-0.7 eV, preferably 150 meV-0.6 eV, preferably 200 meV-0.5 eV. The low magnesium diffusion barrier of the compounds as described herein allows efficient reversible Mg insertion and removal at an appreciable rate of discharge and charge and enables the materials to be used as electroactive materials for the magnesium electrodes. Furthermore, materials with high Mg mobility barriers would be excluded, based on expected poor Mg mobility and therefore very low rate capability. These criteria based on computations of Mg barriers provide a powerful means of identifying metal phosphorous sulfide materials (known and unknown) with good Mg mobility and hence potential application as Mg electrode materials.

According to an additional aspect, the present disclosure relates to a method of forming the electrode material described herein in any of its embodiments, comprising ball milling a metal sulfide material and a phosphorous sulfide material.

As used herein, "ball milling" and "ball mill" refer to a type of grinder or method of grinding used to grind and blend materials for use in processes. A ball mill, a type of grinder, is a cylindrical device used in grinding or mixing materials. Ball mills rotate around a horizontal axis, partially filled with the material to be ground plus the grinding medium. Different materials can be used as grinding media including, but not limited to, ceramic balls, flint pebbles and stainless steel balls. A ball mill works on the principle of impact and attrition achieved by impact as the materials drop during rotation. Ball mills are used extensively in mechanical alloying processes in which they are not only used for grinding but for cold welding as well, with the purpose of producing alloys from powders. Ball milling allows for control of key properties in the grinding media including, but not limited to, size, density, hardness, and composition.

As used herein, a metal sulfide material refers to compounds having the general formula Q$_e$S$_d$ where Q is a metal, preferably a transition metal, S is sulfur and e and d are independently whole numbers greater than zero. In a preferred embodiment, the metal sulfide is at least one selected from the group consisting of MgS, FeS, CuS, Ag$_2$S, NiS, CoS, Cr$_2$S$_3$, and MnS. As used herein, a phosphorous sulfide material refers to compounds having the general formula P$_g$S$_h$ wherein P is phosphorous, S is sulfur, and g and h are independently whole numbers greater than zero. In a preferred embodiment, the phosphorous sulfide is at least one selected from the group consisting of P$_2$S$_5$, P$_4$S$_4$, P$_4$S$_5$, P$_4$S$_6$, P$_4$S$_7$, P$_4$S$_8$, and P$_4$S$_9$. In a preferred embodiment, the ratio of the metal sulfide material to the phosphorous sulfide material is in the range of 0.1:1 to 10:1, preferably 0.5:1 to 5:1, preferably 1:1 to 4:1, preferably 1.5:1 to 3:1, preferably 2:1 to 7:3.

In a preferred embodiment, the ball milling is performed using ceramic balls, preferably zirconium dioxide, ZrO$_2$, balls of a substantially spherical shape having an average spherical diameter of 2-20 mm, preferably 4-15 mm, preferably 5-10 mm. In a preferred embodiment the ball mill grinding is performed under an inert gas (i.e. argon or nitrogen), preferably argon for a period of 2-48 hours, preferably 8-36 hours, preferably 12-30 hours, preferably 18-24 hours, or about 20 hours at a speed of 100-1000 rpm, preferably 200-800 rpm, preferably 250-600 rpm, preferably 300-400 rpm, preferably 320-380 rpm.

According to an additional aspect, the present disclosure relates to a method of forming an in situ electrode material, the method comprising passing an electrical current through the electrochemical cell in any of its embodiments to generate and in situ electrode material comprising a composite of formula (II)

$$N_aP_bS_c \quad (II)$$

wherein N is a metal, a, b, and c are each independently a positive number, and wherein the composite, the material, or both do not comprise an oxide species, and wherein the in situ electrode material is different than the electrode material and the metal N is different than the metal M.

As charge is passed through an electrode material comprising a composite of formula (I) in an electrochemical cell as described herein in any of its embodiments the cathodes follow a reversible displacement reaction. Not wishing to be bound by theory, the inventors believe that both phosphorous and sulfur are involved in the charge transfer during a for example magnesiation/demagnesiation. Thus, when the anode is Mg and the metal M of the composite of general formula (I) is not Mg at the cathode a composite of general formula (II) wherein the metal N is Mg will be formed and deposited at the cathode site. Thus, before a charge is applied the cathode may comprise greater than 80% of an electrode material comprising a composite of formula (I), preferably greater than 90%, preferably greater than 95%, preferably greater than 98%, preferably greater than 99% of an electrode material comprising a composite of formula (I) and after applying a charge the cathode may comprise a composite of formula (I) and a composite of formula (II). In certain embodiments, after applying a charge, 1-99% of the electrode material comprises a composite of formula (I), preferably 20-90%, preferably 30-70%, preferably 40-60% of an electrode material comprising the composite of formula (I) and 1-99% of an electrode material comprising a composite of formula (II), preferably 20-90%, preferably 30-70%, preferably 40-60% of an electrode material comprising a composite of formula (II).

In one embodiment, the metal M is at least one selected from the group consisting of Ag, Mg, Cu, Fe, Ni, Co, Cr, and Mn and the metal N is at least one selected from the group consisting of Ag, Mg, Cu, Fe, Ni, Co, Cr, and Mn. In one embodiment, the composite of formula (I) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_7S_7$, $Cu_7P_6S_{22}$, and $Cu_3P_2S_8$ and the composite of formula (II) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_7S_7$, $Cu_7P_6S_{22}$, and $Cu_3P_2S_8$.

In further embodiments, the present disclosure includes an electronic device containing the battery according to the present disclosure in any of its embodiments. As used herein, the term "electronic device" refers to any power driven device for controlling the flow of electrical current for the purpose of information processing and system control including, but not limited to, consumer electronics, professional-grade electronics, portable electronics, electrical grids, cell phones, mobile phones, smartphones, laptops, tablets, digital cameras, camcorders, televisions, game consoles, flashlights, and power tools.

In further embodiments, the present disclosure includes a vehicle containing the battery according to the present disclosure. As used herein, the term "vehicle" refers to any power driven device designed for transportation including, but not limited to, an automobile, truck, van, bus, aircraft, Pedelecs, hybrid vehicles, wheelchairs, radio-controlled models, golf cart, and other utility forms of transportation.

Having generally described this disclosure, a further understanding can be obtained by reference to certain specific examples which are provided herein for purposes of illustration only and are not intended to be limiting unless otherwise specified.

EXAMPLES

Preparation and Electrochemical Performance of Phosphorous Sulfide Based Cathode Materials in Magnesium Batteries The amorphous $Ag_7P_3S_7$ (a-APS) cathode material was prepared with a ball milling process. Typically, $Ag_2S$ and $P_2S_5$ with a desired molar ratio of 7:3 were placed into an argon gas filled zirconium pot with 10 and 5 mm $ZrO_2$ balls (10 and 10 balls, respectively) and grinded for a total of 20 hours at 370 rpm. The cathode was prepared by mixing 60 wt % active material, 20 wt % polytetrafluoroethylene (PTFE) and 20 wt % of conductive carbon followed by being pressed to a 120 μm sheet. The electrochemical performance was tested in a 2032 coin cell using the $Ag_7P_3S_7$ electrode as a cathode, Mg metal (after cleaning the surface) as an anode and glassy fiber filter paper as a separator. An amount of 0.15 mL $Mg(CB_{11}H_{12})_2$ (MMC) electrolyte was added to each cell. FIG. 1 shows the cycling profiles of the a-APS cathode materials in a magnesium battery. From the second cycle, the cell can deliver a capacity of 132 mAh/g with the average voltage of 1.5 V vs $Mg/Mg^{2+}$. With this un-optimized cathode material and cell design, this active material still showed better performance than that of the classical Chevrel phase ($Mo_6S_8$, theoretical capacity 128 mAh/g, average voltage 1.1 V).

Figure 2:
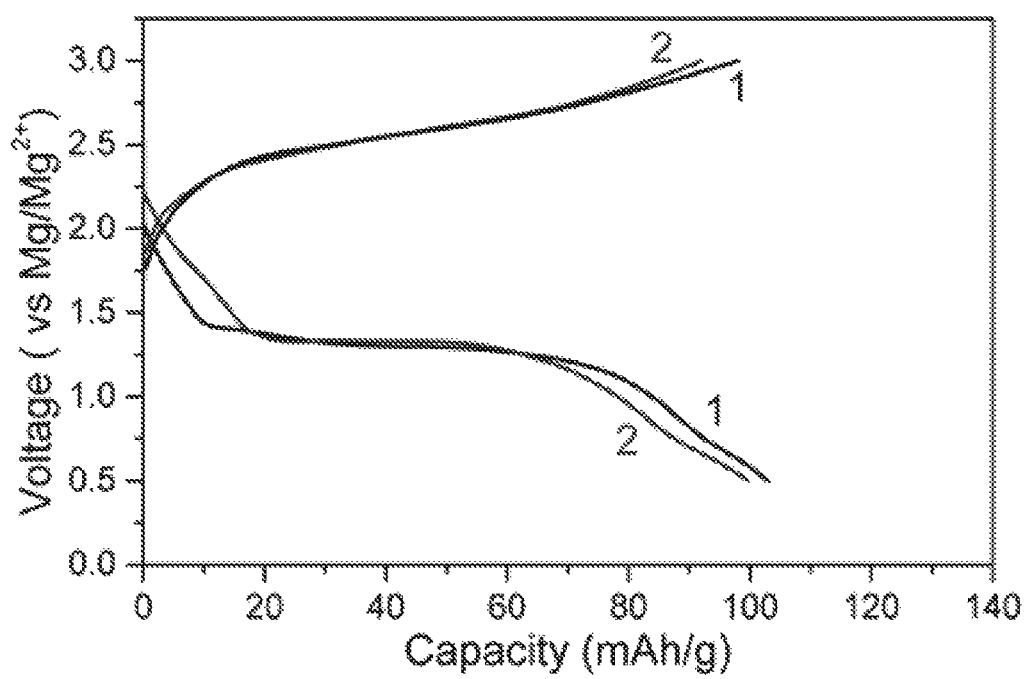
FIG. 2 shows a cycling profile of a 2032 coin cell magnesium battery employing $Mg(CB_{11}H_{12})_2$ (MMC) as an electrolyte and with a cathode containing 60 wt % of an amorphous $Cu_3P_2S_8$ (a-CPS) composite active material.
Figure 3:
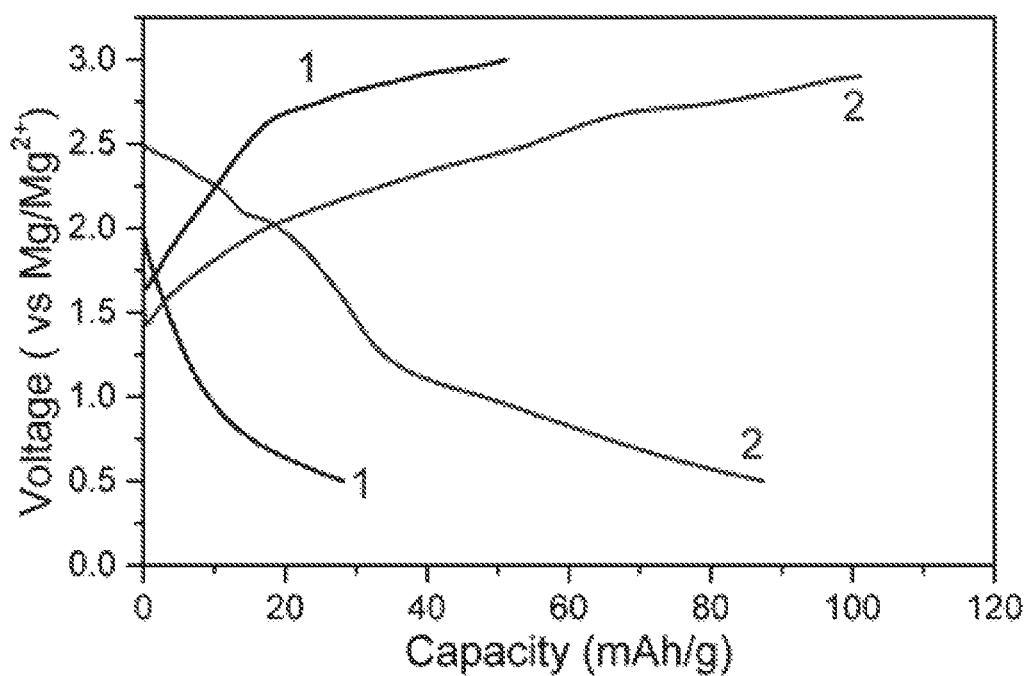
FIG. 3 shows a cycling profile of a 2032 coin cell magnesium battery employing $Mg(CB_{11}H_{12})_2$ (MMC) as an electrolyte and with a cathode containing 60 wt % of an amorphous $Fe_3P_2S_8$ (a-FPS) composite active material.

The preparation of the amorphous $Cu_3P_2S_8$ (a-CPS) cathode active material and the amorphous $Fe_3P_2S_8$ (a-FPS) cathode active material, the electrode, and the test conditions for each were the same as that of the a-APS material. FIG. 2 shows a cycling profile and the performance of the a-CPS material in magnesium batteries, and demonstrates the very promising result observed with this un-optimized cathode material. FIG. 3 shows a cycling profile and the performance of the a-FPS material in magnesium batteries, and demonstrates the very promising result observed with this un-optimized cathode material.

Figure 4:
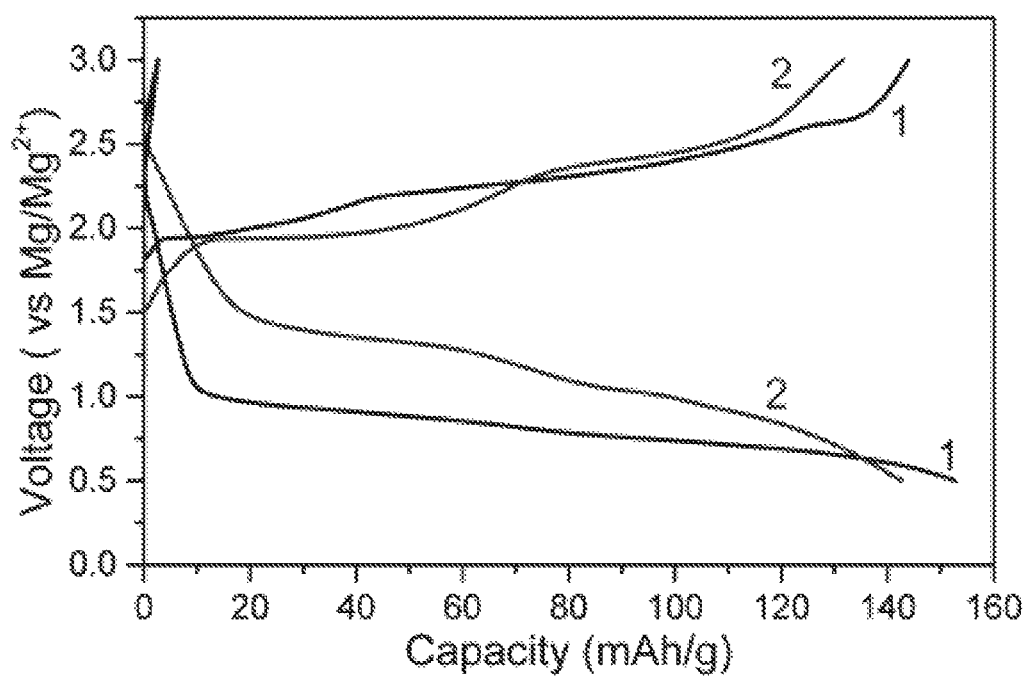
FIG. 4 shows a cycling profile of a 2032 coin cell magnesium battery employing $Mg(CB_{11}H_{12})_2$ (MMC) as an electrolyte and with a cathode containing 60 wt % of a crystalline $Ag_7P_3S_7$ (c-APS) composite active material.

The crystalline $Ag_7P_3S_7$ (c-APS) cathode material was prepared by calcinating the a-APS material at 270° C. for 2 hour in an argon (Ar) atmosphere. FIG. 4 shows the cycling profile of the c-APS material, where higher capacity that of the a-APS material was observed. This indicates that calcination of a-APS can likely improve its electrochemical performance.

Figure 5:
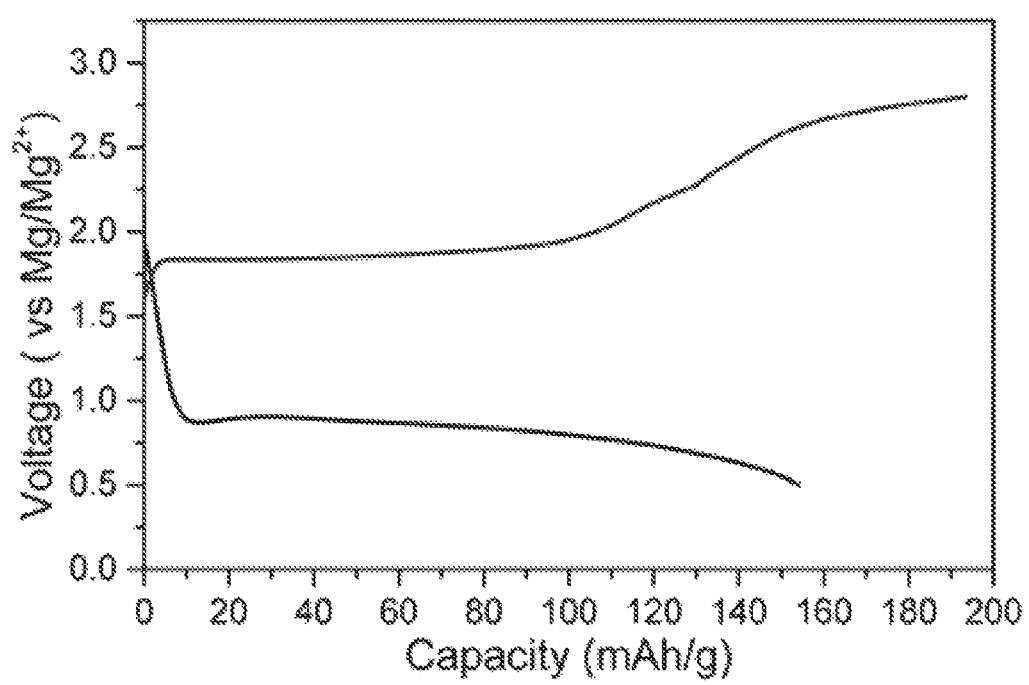
FIG. 5 shows a cycling profile of a 2032 coin cell magnesium battery employing $C_6H_5MgCl/THF$ (APC) as an electrolyte and with a cathode containing 60 wt % of an amorphous $Ag_7P_3S_7$ (a-APS) composite active material.

Further, the amorphous $Ag_7P_3S_7$ (a-APS) cathode material was tested in a $C_6H_5MgCl/THF$ (APC) electrolyte. FIG. 5 shows the cycling profile and electrochemical performance of the a-APS material tested in the APC electrolyte. Although the overcharge behavior (which is related to a low stability property of the APC electrolyte) necessitates optimization, the cathode still delivered a similar discharge profile as that observed in the MMC electrolyte. These results suggest that the APS materials can work in a wide variety of or electrolytes or any electrolyte and that their performance is not related to the properties of the electrolyte.

Reaction Mechanism Study

Figure 6:
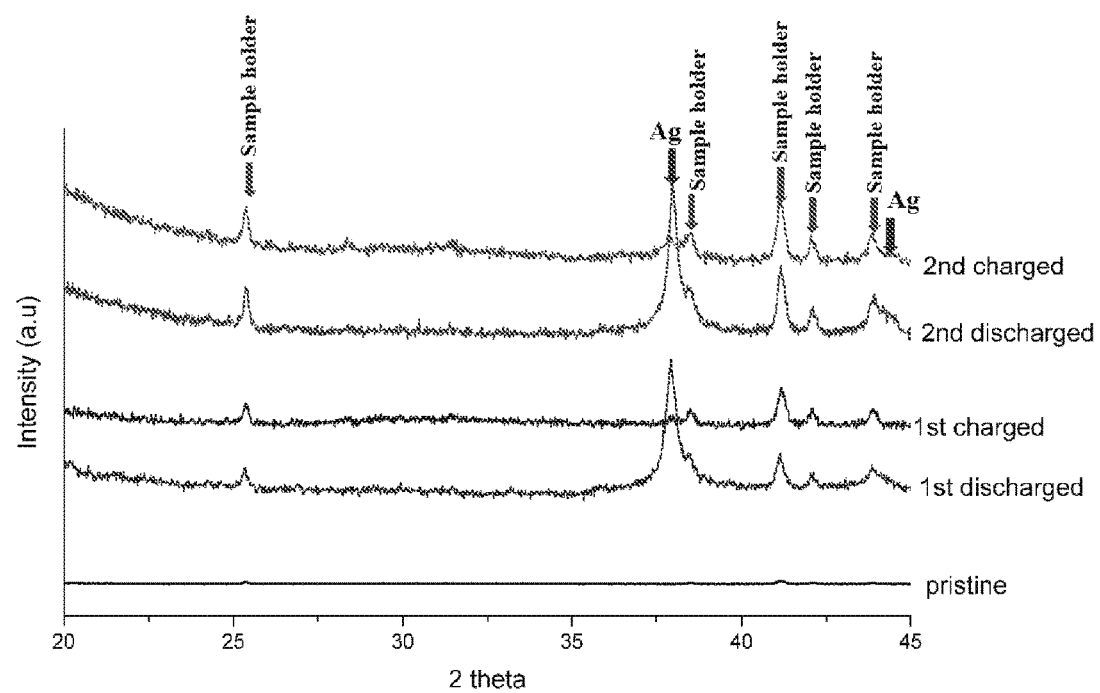
FIG. 6 shows the ex-situ X-ray diffraction (XRD) patterns of the amorphous $Ag_7P_3S_7$ (a-APS) electrode at different electrochemical states: (i) pristine, (ii) $1^{st}$ discharged, (iii) $1^{st}$ charged, (iv) $2^{nd}$ discharged, and (v) $2^{nd}$ charged.

The reaction mechanism was studied using ex-situ X-ray diffraction (XRD) of the electrode at different electrochemical states: (i) pristine, (ii) $1^{st}$ discharged, (iii) $1^{st}$ charged, (iv) $2^{nd}$ discharged, and (v) $2^{nd}$ charged. To avoid air contamination, all of the electrodes were sealed as an air-free sample in an Ar glove box before the XRD scan was taken. FIG. 6 shows the ex-situ XRD patterns of the a-APS electrode material at different electrochemical states. The peaks marked with arrows as "sample holder" are related to the diffraction from the sample holder. An examination of the XRD pattern from pristine to the $2^{nd}$ charged electrode, it is possible to conclude that only Ag reversibly deposited/faded in the electrode and no other crystalline phase could be observed. Based upon the analysis of the XRD pattern, the APS cathode can be found to follow a displacement reaction mechanism and can be described as below by formula (III).

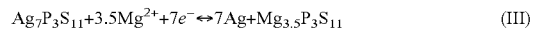

Further, a general equation to describe the discharge/charge process can be described as below by formula (IV).

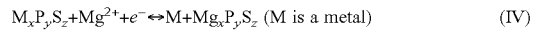

Comparative Cathode Materials of Ag Metal, $AgCB_{11}H_{12}$, CuS and $Ag_2S$ (After 20 Hours Mechanical Milling)

Figure 7:
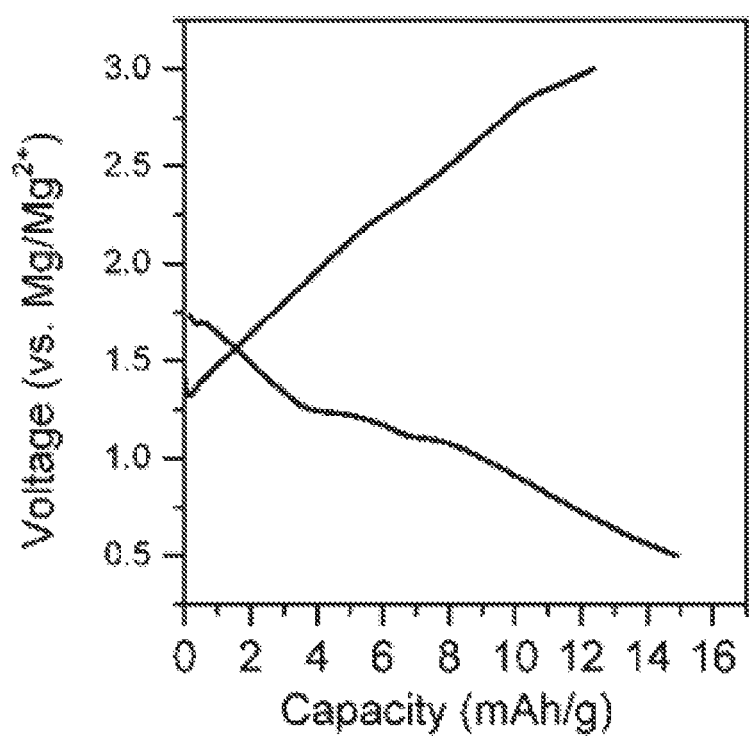
FIG. 7 shows the cycling profiles of a 2032 coin cell magnesium battery employing $Mg(CB_{11}H_{12})_2$ (MMC) as an electrolyte and with a cathode containing the comparative active material $Ag_2S$.
Figure 8:
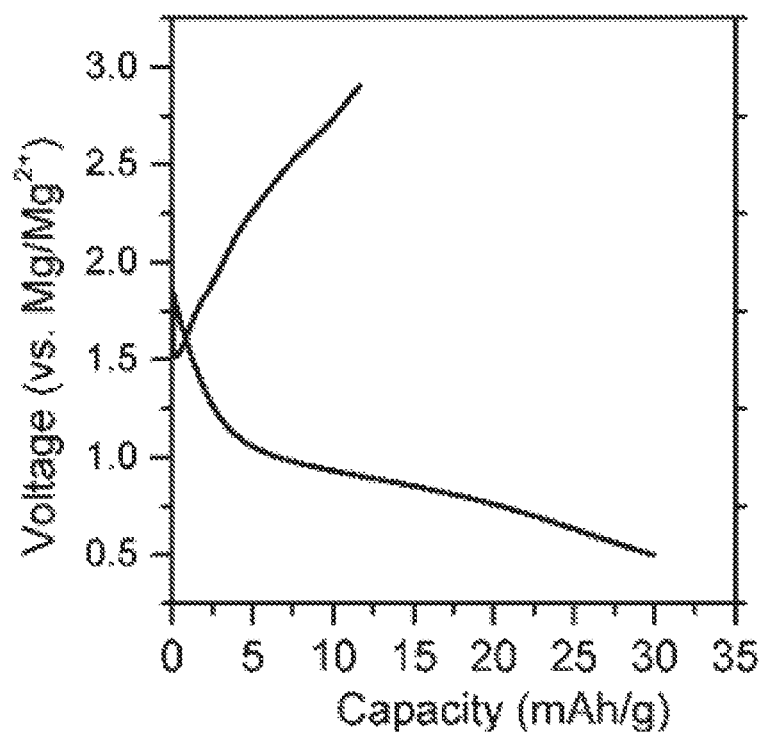
FIG. 8 shows the cycling profiles of a 2032 coin cell magnesium battery employing $Mg(CB_{11}H_{12})_2$ (MMC) as an electrolyte and with a cathode containing the comparative active material CuS.
Figure 9:
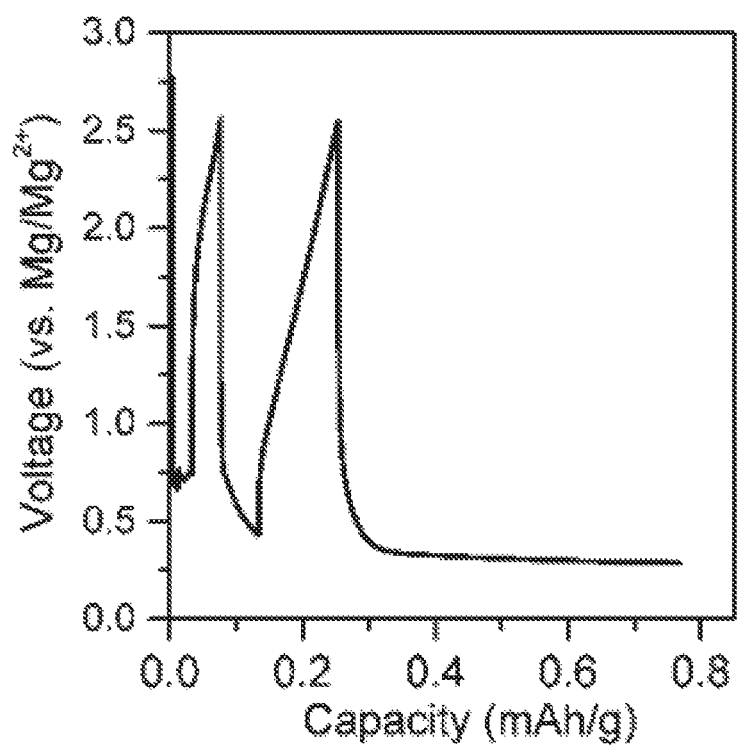
FIG. 9 shows the cycling profiles of a 2032 coin cell magnesium battery employing $Mg(CB_{11}H_7)_2$ (MMC) as an electrolyte and with a cathode containing the comparative active material of Ag metal.

In order to further evaluate the reaction mechanism several materials were tested under the same conditions in the MMC electrolyte. FIGS. 7, 8, and 9 show the cycling profiles of these materials. It is noted that the Ag electrode only was charged in FIG. 9, although its voltage profile shows a voltage increase and decrease. The unusual voltage jumping and dropping phenomenon during the charging process was related to the short circuit of the cell due to the continuous deposition of Ag at the Mg anode. In contrast, the CuS cathode (FIG. 8) delivered an initial discharge capacity of 30 mAh/g without a voltage plateau. The $AgCB_{11}H_{12}$ cathode (not shown) delivered an initial discharge capacity of 35 mAh/g with a voltage plateau around 2.3 V. However, due to the high solubility of $AgCB_{11}H_{12}$ in the electrolyte, its capacity quickly faded. Unlike $AgCB_{11}H_{12}$, the mechanically milled $Ag_2S$ electrode (FIG. 7) showed a slope voltage profile with very low capacity, indicating that this material likely performed a surface reaction during magnesiation/demagnesiation. To summarize, none of the comparative materials showed a similar capacity or voltage plateau as that of the $M_xP_yS_z$ cathode materials (specifically c-APS, a-APS, and c-CPS). Based on the comparative tests, at least two conclusive points can be drawn: i) the reaction mechanism described above is correct, and ii) the phosphorous sulfide ($P_yS_z^{n-}$) anion is the key component in the cathode material allowing it to deliver the excellent performance observed.

Thus, the forgoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein defines, in part, the scope of the foregoing claim terminology such that no inventive subject matter is dedicated to the public.

The invention claimed is:

1. An electrode material, comprising:
    a composite of formula (I)

$$M_xP_yS_z \qquad (I)$$

wherein M is at least one metal selected from the group consisting of Mg, Ag, Cu, Fe, Ni, Co, Cr, and Mn;
    x is independently a number from 2-10,
    y is independently a number from 1-15, and
    z is independently a number from 4-30; and
        wherein the composite, the material, or both do not comprise an oxide species.

2. The electrode material of claim 1, wherein the structure of the composite is substantially amorphous or substantially crystalline.

3. The electrode material of claim 1, wherein the composite of formula (I) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_2S_7$, $Cu_7P_6S_{22}$, and $Cu_3P_2S_8$.

4. An electrode, comprising:
    a current conductive agent; and
    an electrode material, the electrode material comprising the composite of formula (I) according to claim 1.

5. The electrode of claim 4, wherein the structure of the composite is substantially amorphous or substantially crystalline.

6. The electrode of claim 4, wherein the metal is at least one metal selected from the group consisting of Ag, Mg, Cu, Fe, Ni, Co, Cr and Mn.

7. The electrode of claim 4, wherein the composite of formula (I) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_2S_7$, $Cu_7P_6S_{22}$, and $Cu_3P_2S_8$.

8. The electrode of claim 4, which comprises 40-90% by weight of the electrode material relative to the total weight of the electrode.

9. The electrode of claim 4, wherein the current conductive agent is a conductive carbon; and
    wherein the electrode comprises 10-30% by weight of the conductive carbon relative to the total weight of the electrode.

10. The electrode of claim 4, further comprising:
    a polymeric binder; and
    wherein the electrode comprises 5-30% by weight of the polymeric binder relative to the total weight of the electrode.

11. An electrochemical cell, comprising:
    an anode,
    the electrode of claim 4 as a cathode; and
    an electrolyte:
        wherein the anode and the cathode are capable of absorbing an alkali metal ion, an alkaline earth metal ion, or both.

12. The electrochemical cell of claim 11, wherein the anode is magnesium.

13. A magnesium battery comprising the electrochemical cell of claim 11.

14. The magnesium battery of claim 13, wherein the structure of the composite is substantially amorphous or substantially crystalline.

15. The magnesium battery of claim 13, wherein the metal is at least one metal selected from the group consisting of Ag, Mg, Cu, Fe, Ni, Co, Cr and Mn.

16. The magnesium battery of claim 13, wherein the composite of formula (I) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_2S_7$, $Cu_7P_6S_{22}$, and $Cu_3P_2S_8$.

17. The magnesium battery of claim 13, wherein the cathode comprises:
    40-90% by weight of the electrode material relative to the total weight of the cathode;
    10-30% by weight of a conductive carbon as the current conductive agent relative to the total weight of the cathode; and
    5-30% by weight of a polymeric binder relative to the total weight of the cathode.

18. The magnesium battery of claim 13, wherein the electrolyte comprises at least one selected from the group consisting of $Mg(CB_{11}H_{12})_2$ and $C_6H_5MgCl$.

19. The magnesium battery of claim 13, which has a capacity of 80-600 mAh/g.

20. The magnesium battery of claim 13, which has an average voltage of 1.0-2.0 V vs. $Mg/Mg^{2+}$.

21. A vehicle comprising the magnesium battery of claim 13.

22. An electronic device comprising the magnesium battery of claim 13.

23. A method of forming the electrode material of claim 1, comprising:
    ball milling a metal sulfide material and a phosphorous sulfide material.

24. The method of claim 23, wherein the metal sulfide is at least one selected from the group consisting of MgS, FeS, CuS, $Ag_2S$, NiS, CoS, $Cr_2S_3$ and MnS.

25. The method of claim 23, wherein phosphorous sulfide is at least one selected from the group consisting of $P_2S_5$, $P_4S_4$, $P_4S_5$, $P_4S_6$, $P_4S_7$, $P_4S_8$, and $P_4S_9$.

26. A method of forming an in situ electrode material in addition to the composite of formula (I), the method comprising:

passing an electrical current through the electrochemical cell of claim 11 to generate an in situ electrode material comprising composite of formula (II)

$$N_a P_b S_c \qquad (II)$$

wherein the composite of formula (I) is at least one selected from the group consisting of $Mg_2P_2S_7$, $Mg_3(PS_4)_2$, $Ag_4P_2S_7$, $As_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_2S_7$, $Cu_7P_6S_{22}$, and $Cu_3P_7S_8$ and the composite of formula (II) is at least one selected from the group consisting of $Mg_2P_2S_7$, $Mg_3(PS_4)_2$, $Ag_4P_2S_7$, $Ag_3PS_4$, $Ag_7P_3S_7$, $Ag_7P_3S_{11}$, $Fe_3P_2S_8$, $Fe_2P_2S_7$, $Fe_7P_6S_{22}$, $Cu_2P_2S_7$, $Cu_7P_6S_{22}$, and $Cu_3P_2S_8$; and wherein the composite, the material, or both do not comprise an oxide species;

wherein the in situ electrode material is different than the electrode material and the metal N is different than the metal M.

* * * * *